United States Patent [19]

Huessler

[11] Patent Number: 5,157,816
[45] Date of Patent: Oct. 27, 1992

[54] INTERCONNECTION OF CYLINDRICAL PARTS

[75] Inventor: Walter Huessler, Stuhr, Fed. Rep. of Germany

[73] Assignee: Erno Raumfahrttechnik GmbH, Fed. Rep. of Germany

[21] Appl. No.: 549,535

[22] Filed: Jul. 9, 1990

Related U.S. Application Data

[63] Continuation of Ser. No. 233,286, Aug. 17, 1988, abandoned.

[30] Foreign Application Priority Data

Aug. 18, 1987 [DE]  Fed. Rep. of Germany ....... 3727448

[51] Int. Cl.⁵ ............................................. F16L 33/02
[52] U.S. Cl. ...................................... 24/483; 24/279; 24/283
[58] Field of Search .................. 24/19, 279, 283, 71.1, 24/68 R, 483; 403/338, 335; 285/367, 408, 411

[56] References Cited

U.S. PATENT DOCUMENTS

| | | | |
|---|---|---|---|
| 1,432,572 | 10/1922 | Schroeder | 24/283 |
| 1,468,297 | 9/1923 | Hogg et al. | 24/283 |
| 2,561,635 | 7/1951 | Prochaska | 24/283 |
| 3,029,095 | 4/1962 | King et al. | 285/367 X |
| 3,104,898 | 9/1963 | MacDonald et al. | 285/367 X |
| 3,359,018 | 12/1967 | Simons | 285/367 |
| 3,861,723 | 1/1975 | Kunz et al. | 24/279 X |
| 4,489,464 | 12/1984 | Massari et al. | 24/279 |
| 4,527,818 | 7/1985 | Rundell | 285/367 X |

FOREIGN PATENT DOCUMENTS

| | | | |
|---|---|---|---|
| 2157193 | 8/1972 | Fed. Rep. of Germany | 24/279 |
| 425982 | 10/1947 | Italy | 24/279 |
| 573695 | 12/1945 | United Kingdom | 24/279 |

Primary Examiner—James R. Brittain
Attorney, Agent, or Firm—R. H. Siemund

[57] ABSTRACT

The parts are interconnected by means of split strap arrangement engaging clamping elements which, through wedge action engage flanges of the parts and hold them together.

8 Claims, 2 Drawing Sheets

INTERCONNECTION OF CYLINDRICAL PARTS

This is a continuation of co-pending application Ser. No. 233,286 filed on Aug. 17, 1988 abandoned.

BACKGROUND OF THE INVENTION

The present invention relates to the interconnection of parts such as a carrier vehicle and its payload under utilization of a clamping strap which grips around the parts to be interconnected and is run around bolts or pins which are arranged transverselly to the direction of tension as applied to or occurring on the clamping strap. The structure of the type referred to above provides a closing or connecting-and-fastening position such that the two pins are releasedly interconnected. Particularly, the invention relates to the interconnection of parts, aerospace parts under utilization of a clamping strap means having, at least in parts, two parallel running strands, straps, or latch portions which grip around parts or components to be interconnected, and, as stated, are run around pins or bolts which extend transversally to the direction of tension in the clamping strap, and wherein, in the closing position parts, strap to be interconnected for purposes of tensioning, are arranged in an overlapping relationship.

Connections of the type to which the invention pertains are used in a variety of fields, including particularly the aerospace industry. The purpose here is, for example, in the case of space technology, to hold payloads on the final stage of a carrier rocket. As a target orbit has been reached, the connection is broken, by releasing the clamping strap. For this one uses equipment outlined more fully above. This type of connection is also known under the name of Marman clamping strap connection, wherein particularly on the inside of the clamping strap, there are arranged a number of clamping elements such as tension screws. These clamping elements have conical indents on the inside which reach over onto correspondingly shaped flanges or interface rings, of those parts on components to be interconnected. In the case of a Marman clamping strap, the clamping element tension screw is broken in some form or another, and the clamping elements are then pulled off the flanges or interference rings and thereby release the previously interconnected parts such that the payload is now separated from the rocket carrier, particularly at the final stage thereof. The known structures of this type are rather complex and thus not necessarily reliable.

DESCRIPTION OF THE INVENTION

It is an object of the present invention to provide a new and improved arrangement of the kind outlined above which further minimizes equipment weight, without compromising integrity, strength, and capability of load carrying; the construction should follow principles permitting application over a large range of cylindrical diameters.

It is, therefore, a specific object of the present invention to provide a new and improved connection between parts which are to be held in an axial, end-to-end relation but which is easily released.

In accordance with the preferred embodiment of the present invention, the connection for the two parts having angular flanges or beads, is made under utilization of a strap connection which includes overlapping strap means being looped around two pins that extend parallel to each other and axially in relation to such parts. These two pins are spread apart through tension-compression rods, tie rods or the like, so that the pins are pushed apart in peripheral direction as far as the parts are concerned, which of course is transverse to the various axes, so that the strap or strap means is tensioned. A plurality of clamping elements are arranged but under bi-parted portions of the strap means only and are being held thereby and urged radially inward onto the flanges or beads; the clamping elements are provided with recesses having inclined surfaces such that upon urging the clamping elements radially inward, the flanges are forced axially against each other. The beads or flanges are preferably bevelled, and the clamping elements each have a bevelled recess of trough-like configuration so that the radially-inward acting force of the strap means is partially translated into a radial and an axial force, the latter holding the two parts together. The straps, particularly the bi-parted portions if used throughout, can be realized by cable; alternatively there may be belts.

The features of the invention provide for uniform spacing of the clamping elements throughout the entire area of connection, and as far as the parts to be interconnected are concerned. This, then, renders uniform the clamping action between the clamping strap on the one hand, and the interference ring or flanges on the other hand. Bending of the flanges or interference rings will not occur if the connection is such that the peripheral tension of the clamping straps is translated (a) into straight radial actions which, in turn, are translated (b) into a composite radial/axial clamping and holding action as between the two parts to be interconnected.

If one would use, as is conventionally the case, tension screws for connecting clamping strap ends to each other, it is possible that the neutral center of the strap in the area of the clamping bolts and of the pins to be connected, have in fact a larger distance from the interference ring than in other areas. Here, then, bending may obtain. Such a concentration of transverse forces and the set-up of bending tensions in interference and rings or flanges would, in fact, reduce the load such a device can safely take up. This additional, undersired and parasitic load is avoided in the structure in accordance with the invention. Here then the entire system can take up drastically higher loads.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
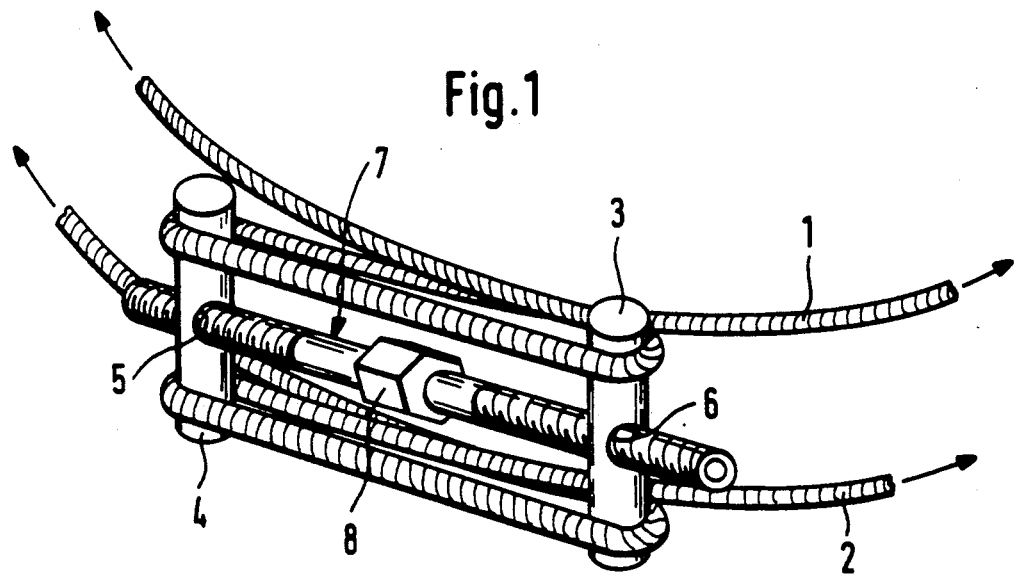
FIG. 1 shows the closure area of a first clamping strap arrangement in accordance with a preferred embodiment of the present invention, for practicing the best mode thereof.
Figure 2:
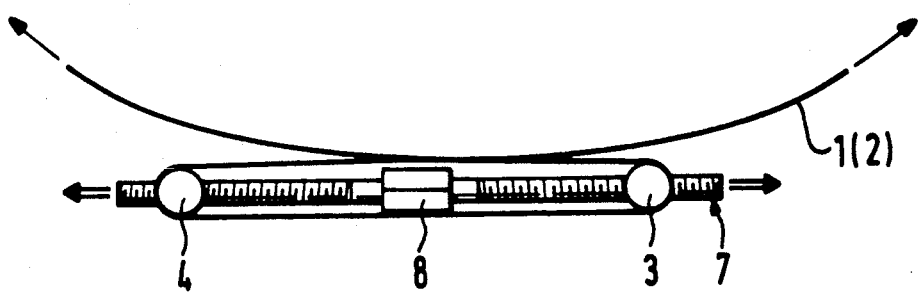
FIG. 2 represents the top view of the device shown in FIG. 1 but in a somewhat simplified fashion; this figure serves also as a vector diagram for indicating the application and effectiveness of forces.

Proceeding now to the detailed description of the drawings, reference is first made to FIG. 1 showing a structure under utilization of clamping strap means established through tension cables 1 and 2. These cables are arranged at a certain axial spacing in relation to each other; they run basically annular and parallel at a constant distance from each other. Clamping cables 1 and 2 are looped around two pins, bolts or posts 3 and 4 in a manner such that each of these cables is, so to speak, doubled back. The two pins 3 and 4 are arranged parallel to each other, and their axes run parallel to the axes of the parts 21, 22 to be interconnected. Of these parts only one (21) is shown in FIG. 2 but see FIG. 4. Indirectly, one can see that the curving of cables 1 and 2 follows the curvature of these parts to be interconnected and therefore define the cylinder.

The pins 3 and 4 are provided with threaded bores 5 and 6 which respectively traverse the pins diametrically, but, as far as the cylinders to be interconnected is concerned, run tangentially thereto. A pressure/tension tie rod-like arrangement 7 with a central adjusting nut 8 has its two ends threaded into the two boards 5 and 6, 7 actually includes two parts both being threaded into 8 from opposite sides, each is separately threaded into one or the other of the bores 5,6.

The tie rod 7 and 8 is basically arranged symmetrically to the pins 3 and 4 as well as to cables 1 and 2. The several threadings as provided are at opposite pitch. Thus, as nut 8 is turned, the two portions of tie rod 7 are shifted axially away from each other so that the two pins 3 and 4 are being pushed apart laterally, thereby appropriately tensioning the cables 1 and 2.

The force distribution that is obtained in this fashion is shown in FIG. 2. The single line arrows represent forces that produce tension in the cable, while the double arrows represent the pressure force exerted by the device 7-8 upon the two pins 3 and 4. Reference numeral 21 refers to one of the parts to be interconnected; 23 is a flange thereof. More details including the other cylindrical part 22 are shown in FIG. 4.

Figure 3:
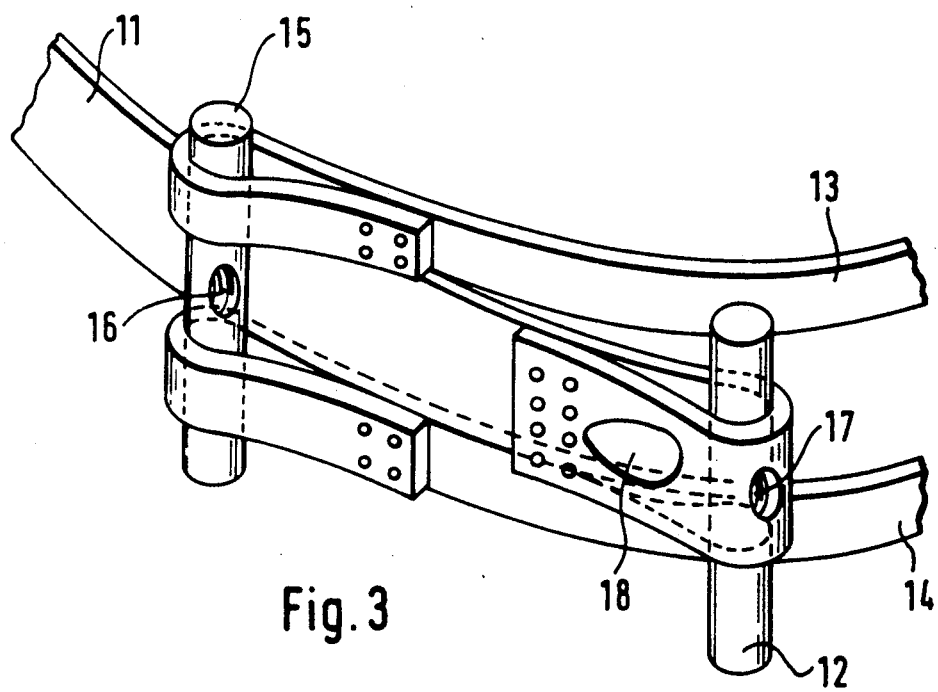
FIG. 3 is a view similar to the one shown in FIG. 1, but the clamping strap is modified for a different application.

Proceeding now to a description of the device shown in FIG. 3, this is the second embodiment and example for interconnecting two parts. The device includes a single piece tension belt 11 which is run through a loop portion around a first post or pin 12 and overlappingly as far as a connect area is concerned, with two, parallel running tension belts 13 and 14. One can say, together these belts constitute a bi-parted tension belt or strap which runs around the second pin 15. The two pins 12 and 15 are also here provided centrally with threaded bores 16 and 17 and these bores a aligned in tangential direction as far as the parts to be interconnected are concerned. For further illustration, the tie rod element 7-8 as per FIG. 1 has been omitted here, but is exactly of the same kind as is used here. Upon turning of the nut, the two pins 12 and 15 will be spread so that the straps and belts are tensioned, and so forth. Hence it again critical that in an overlapping region outwardly running straps are being tensioned through the zone arrangement.

For purposes of completion is should be mentioned that belt 11 may be either bi-parted around the periphery to have two split portions 13 and 14. Alternatively, connections of the type shown in FIG. 3 may alternate around the periphery of the parts to be interconnected, so that single-strap pieces such as 11 and double-strap pieces such as 13 and 14 alternate. The clamping pieces to be more fully described below will, of course, be used only in conjunction with the double-belt configuration 13, 14.

Figures 4, 5:
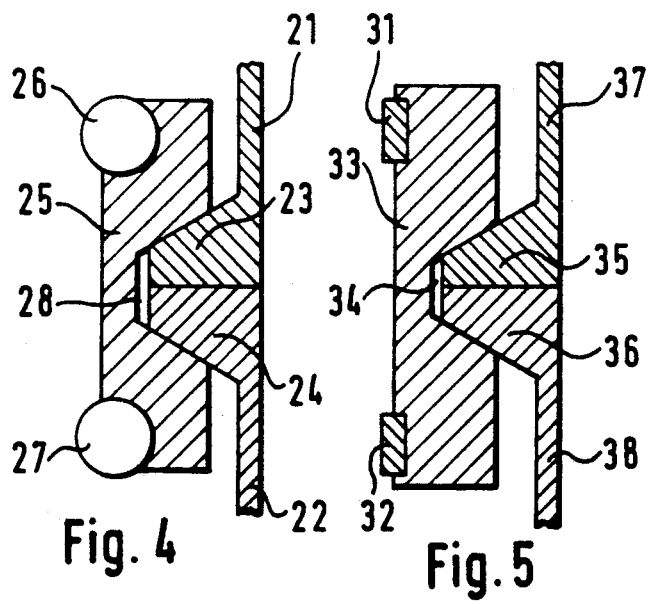
FIG. 4 is a cross-section through a clamping element and through parts to be interconnected, the connection being effected by cable as shown in FIGS. 1 and 2.
FIG. 5 is a cross-section similar to FIG. 4 but with a strap connection as per FIG. 3.

FIG. 4 illustrates a first example for the parts to be interconnected. It is assumed that 21 and 22 are two formed parts or structures. The structure axis is situated in the plane of the drawing and is assumed to be situated somewhat to the right. That axis extends vertically from the point of view of viewing. These two parts 21 and 22 are each provided at upper and lower ends respectively with annular flanges or beads 23 and 24 which abut in a interfaced plane 26.

Reference numeral 25 refers to a clamping element which is provided with matching surfaces being the boundary of a trough-like indent groove, recess or channel 28 so as to receive clampingly both of the flanges 23 and 24 at the bevelled surface portion. Now this particular clamping element 25 is a representative example only; there may be a plurality of them arranged around the periphery of the two parts 21 and 22 to be interconnected. Decisive is that these clamping elements have two grooves 27 which engage and into which are inserted the cables 1 and 2 as per FIG. 1. In other words the forces acting radially inwardly on the clamping element 25 are axially remote from the interface plane of flanges 23/24. The separation of two portions of the clamping strap and arranging them symmetrically in relation to the pressure tension element, is a feature which is realized here through cable 1 and 2. This way the distribution of forces as they arise is further optimized through actual separation.

This strap e.g. cable splitting feature is of particular advantage in conjunction with the clamping elements 25 since it avoids the bending up of the entire connection in a reliable fashion. It is again a factor which permits further increase of operating load and particularly permits application of the invention to equipment for very large diameters.

It can readily be seen that the elements 23 and 24 can also be termed interface rings. FIG. 4 shows specifically, of course, the closing connection wherein the clamping element 25 does, in fact, hold onto the flanges 23 and 24. As stated, there is a plurality of such elements 25 more or less equidistantly arranged around the periphery of the combined flanges 23-24; all of them engage the cable 1 and 2.

The device shown in FIG. 1 provides the requisite tension by means of which the two cables 1 and 2 in a symmetric fashion are forced to urge all the clamping elements 25 in radial inward direction thereby positively holding parts 21 and 22 together. Please note specifically that owing to the oblique surfaces, wedge action obtains, which means that radial forces are in part translated into actual pressure forces by means of which parts 21 and 22, through the flanges 23 and 24, are actually urged onto and in relation to each other.

FIG. 5 illustrates the companion situation in conjunction with the strap arrangement of FIG. 3. For reasons of variety, the parts to be interconnected here are denoted here by reference numeral 37 and 38 and again they are presumed to be parts. The part axis is also assumed to be situated in the plane of the drawing, and extends vertically as far as viewing is concerned, and somewhat to the right. Parts 37 and 38 are, moreover, provided with flanges or interface pieces or beads 35 and 36. They are of an annular configuration with a flat surface to establish interface relationship.

Reference numeral 33 in this example denotes a clamping element similar to element 25, and there are a plurality of such elements arranged around the periphery of parts to be interconnected. This clamping device 33 has also a conical opening or trough with oblique or bevelled surfaces to engage the correspondingly bevelled flange arrangement 35 and 36, to thereby translate radial forces into radial and axial forces for holding parts together. Now there are recesses 32 in the outer portion of the clamping element 33. These recesses are assumed to receive the belts 13 and 14.

It is also important to realize that the belts 13 and 14 are radially, as well as axially, offset from the flanges as far as the interface area is concerned, and exactly that avoids a bend-up of the clamping elements and undesired separation of the two flanges if the load is very high. In other words, the radial forces act on the clamping elements in each instance, above and below the trough 34, the beads, so that the respective radial force exerted by the cable cannot possibly become a spreading force, but is effective owing to the wedge action as a compressing force as far as the beads 23 and 24 is concerned.

Through the selection of adequately long clamping straps, cable or the like, and through providing and arranging of the requisite and suitable number of clamping elements such as 25 and 33, one has in fact available a connective structure which is easily adaptable to a large range of diameters as far as flanges, interface rings, and cylindrical parts generally is concerned. Even very large diameter parts which previously posed considerable problems are now easily available for a connection of the kind described here. Upon providing the parts with the requisite strength, it is not necessary to consider bending motions as such will not be effective on the flanges. The flanges or interface rings are acted upon indirectly through the clamping elements and establish a system which can take up very high loads. The only limiting factor is the purely mechanical material strength of the parts involved, including particularly the interface rings, flanges, and clamping elements 25 and 33.

Thus far the invention has been described with reference to a single connect area such as shown in FIG. 3 or FIG. 1. As far as FIG. 3 is concerned, it is of course implicitly assumed that the belt 11 splits a little to the left in that drawing and thus is bi-parted so as to establish the two belts 13 and 14. As stated, one can, of course, provide a plurality of arrangements of FIGS. 3 and 5 and provide for alternating double and single strap arrangements with clamping elements such as 33 provided only at the double strap zones.

A large number of tension elements (25 or 33) is generally beneficial for obtaining uniformity in the holding pressure. Not only can the tension in the ropes or belts be kept constant, but friction can also be minimized, and of course the larger the number of clamping elements, the easier it is to provide for the requisite centering action for action in a symmetrical fashion to urge and be urged onto the beads or flanges in a plurality of symmetrically arranged radial directions.

The invention is not limited to the embodiments described above but all changes and modifications thereof, not constituting departures from the spirit and scope of the invention, are intended to be included.

I claim:

1. Strap connection for two parts having, annular flanges or beads which, on connection, abut axially;
   overlapping endless strap means looped around said parts;
   two pins extending parallel to each other and axially to said parts the strap means looping around the two pins and being doubled back such that these pins are pulled toward each other in peripheral direction as to the parts;
   at least some part of the strap means being bi-parted;
   spread and tension means for pushing the two pins apart in the peripheral direction as far as said parts are concerned, transversally to said axes so that the strap means is tensioned; and
   a plurality of clamping elements arranged under biparted portions of the strap means and being held thereby such that axially spaced grooves in the clamping element respectively receive different single strand portions of the biparted strap means, these portions being urged radially inwardly, the clamping elements each being provided with recesses having inclined surfaces in abutment with the flanges or beads so that upon urging the clamping elements radially inwardly, the flanges or beads are engaged by the clamping elements in the respective recesses and forced axially against each other.

2. Connection as in claim 1, the portions of the biparted strap means being axially displaced from each other so are the grooves in which these portions are inserted so that any radial force they provide onto the respective clamping elements each acts axially displaced from the inclined surfaces.

3. Connection as in claim 1, the strap means being cable.

4. Connection as in claim 1, the flanges or beads being bevelled, the clamping elements having bevelled trough-like recesses for receiving these flanges or beads.

5. Connection as in claim 3, the strap means being two endless cables.

6. Strap connection for two parts having annular flanges or beads which abut in a common interface comprising:
   a pair of pins;
   a first and a second, separate strap, each strap
     (a) being endless;
     (b) looping around one of the parts;
     (c) looping around both pins of the pair, the pins extending parallel to each other, each strap doubling back at each pin;
   a plurality of clamping elements each gripping both flanges or beads to hold them together, each clamping element having two grooves, axially spaced apart for respectively engaging both straps; and
   tension spread means including threaded rod means at opposite pitch and being under compression, for spreading the pins away from each other to tighten the straps into engagement with the clamping elements, and urging each clamping element against both parts.

7. Connection as in claim 6, the flanges or beads are bevelled so that matching surfaces of the clamping elements are being tightened hold the flanges or beads together.

8. Connection as in claim 7, the straps engaging the element axially spaced from the bevels.

* * * * *